United States Patent
Frankland

(10) Patent No.: US 10,355,518 B2
(45) Date of Patent: Jul. 16, 2019

(54) METHOD FOR ELIMINATING FLICKER IN EMERGENCY LIGHTING DRIVER DEVICES DURING PULSE CHARGING

(71) Applicant: TRIDONIC GMBH & CO KG, Dornbirn (AT)

(72) Inventor: James Frankland, Barton (GB)

(73) Assignee: TRIDONIC GMBH & CO KG, Dornbirn (AT)

( * ) Notice: Subject to any disclaimer, the term of this patent is extended or adjusted under 35 U.S.C. 154(b) by 173 days.

(21) Appl. No.: 15/664,569

(22) Filed: Jul. 31, 2017

(65) Prior Publication Data

US 2018/0062425 A1 Mar. 1, 2018

(30) Foreign Application Priority Data

Aug. 31, 2016 (GB) .................................. 1615061.7

(51) Int. Cl.
| | | |
|---|---|---|
| *H02J 9/06* | (2006.01) | |
| *H02J 7/00* | (2006.01) | |
| *H05B 33/08* | (2006.01) | |
| *H02J 7/10* | (2006.01) | |

(52) U.S. Cl.
CPC .............. *H02J 9/06* (2013.01); *H02J 7/0068* (2013.01); *H02J 7/0093* (2013.01); *H05B 33/089* (2013.01); *H05B 33/0851* (2013.01); *H02J 2007/105* (2013.01)

(58) Field of Classification Search
CPC .......... H02J 9/06; H02J 7/0068; H02J 7/0093; H02J 2007/105; H05B 33/0851; H05B 33/089
See application file for complete search history.

(56) References Cited

U.S. PATENT DOCUMENTS

| | | |
|---|---|---|
| 5,463,305 A | 10/1995 | Koenck |
| 2004/0257041 A1 | 12/2004 | Nagaoka |
| 2008/0174929 A1 | 7/2008 | Shen et al. |
| 2013/0147351 A1 | 6/2013 | Trainor et al. |
| 2015/0091451 A1 | 4/2015 | Williams |

FOREIGN PATENT DOCUMENTS

| | | |
|---|---|---|
| JP | 2015130725 | 7/2015 |
| WO | 2013005162 | 1/2013 |

OTHER PUBLICATIONS

GB Search Report dated Feb. 23, 2017 in parent GB Application 1615061.7.
European Search Report and Opinion dated Jan. 31, 2018 in co-pending European application 17 185 234.6 (Publication 3 291 648).

*Primary Examiner* — Robert L Deberadinis
(74) *Attorney, Agent, or Firm* — Andrus Intellectual Property Law

(57) ABSTRACT

An emergency lighting driver device is configured to assume an operation mode in which: the battery is charged by applying the pulse signal to the transistor from the control unit, while the LED load is driven, wherein the emergency lighting driver device is configured to delay the pulse signal such that the rising edge(s) and/or falling edge(s) of the pulse signal have a transition time of at least 0.5 seconds, preferably at least 1 second, more preferred more than 1.5 seconds and preferably less than 3 seconds; and/or wherein the pulse signal is fed through a low pass filter unit of the emergency lighting driver device delaying the transition time of the rising edge(s) and/or falling edge(s) of the pulse signal before feeding it to the transistor.

26 Claims, 4 Drawing Sheets

METHOD FOR ELIMINATING FLICKER IN EMERGENCY LIGHTING DRIVER DEVICES DURING PULSE CHARGING

CROSS REFERENCE TO RELATED APPLICATION

The present application claims priority to Great Britain Patent Application GB 1615061.7, filed Aug. 31, 2016.

FIELD OF THE INVENTION

The present invention relates to emergency lighting driver devices for driving a lighting unit comprising at least one emergency lighting source, in particular to emergency lighting driver devices for driving a LED unit comprising at least one LED. The invention further relates to an emergency lighting device comprising one of such emergency lighting driver devices and a lighting unit comprising at least one emergency lighting source, preferably a LED unit comprising at least one LED, as well as to methods for charging the battery of such emergency lighting driver devices.

TECHNICAL BACKGROUND

In the prior art emergency lighting driver devices for driving a lighting unit with at least one emergency lighting source, in particular a LED unit with at least one LED, are well known.

In complex lighting systems, such as the lighting system in a large building, emergency lighting driver devices are vital in order to provide emergency lighting in case the normal electrical energy supply of the lighting system, such as e.g. mains, is disturbed or interrupted. That is, in case of emergency event, such an emergency lighting driver device is configured to provide an emergency lighting, wherein the emergency lighting driving device comprises a battery for driving a lighting unit comprising at least one emergency lighting source in the emergency operation mode. An emergency event is for example a black-out caused by the public utility company or a fire which disturbs or interrupts the normal electrical energy supply. The emergency lighting driver device is configured to monitor the normal electrical energy supply, in order to drive the lighting unit with at least one emergency lighting source in the emergency operation mode upon detecting a drop in the electrical energy or voltage of the normal electrical energy supply. During the normal operation mode, i.e. when the normal electrical energy supply is working, the emergency lighting driver device does not drive the lighting unit with the at least one emergency lighting source. The emergency lighting driver unit may charge its battery in the normal operation mode.

Specific emergency lighting driver devices are known which are configured to drive the lighting unit, in addition to the battery-driven emergency operation mode, in the normal operation mode, wherein the electrical energy for driving the lighting unit comes from a mains voltage.

The battery of the emergency lighting driver device must be charged during the normal operation mode with electrical energy from the normal electrical energy source, i.e. mains, in order to be able to provide electrical energy for driving the lighting unit during the emergency operation mode.

The battery of an emergency lighting driver device is typically charged during the normal operation mode. For charging the battery a pulse charge method may be used, i.e. the battery is alternately charged for a certain time period and then not charged for a certain time period. To implement such a pulse charging, the battery is alternately connected and disconnected from the supply with electrical energy starting from the normal electrical energy source, wherein the battery is charged with electrical energy when being connected to the normal electrical energy source and not charged when being disconnected.

Usually this is achieved by connecting a switch in series to the battery, wherein the series connection of the battery and the switch is in parallel to the normal electrical energy source. For performing the pulse charge method the switch is then controlled using a pulse signal, wherein e.g. the switch is turned on, i.e. switched to the conducting state, as a result of a rising edge of the pulse signal and turned off, i.e. switched to the non-conducting state, as a result of a falling edge of the pulse signal. When the switch is in the conducting state, the battery is charged with electrical energy from the normal electrical energy source and when the switch is in the non-conducting state the battery is not charged with electrical energy. The pulse charge method is preferred for charging nickel-metal hydride batteries (NiMh).

The present invention is now concerned with a further specific type of emergency lighting driver devices that are configured
- to drive a lighting unit with at least one emergency lighting source with the electrical energy stored in its battery in the emergency operation mode,
- to drive the lighting unit with electrical energy provided from the normal electrical energy source, e.g. mains, in the normal operation mode, and
- to charge its battery with electrical energy provided from the normal electrical energy source, while driving the lighting unit with electrical energy provided from the normal electrical energy source, in the normal operation mode.

When such an emergency lighting driver device according to the state of the art drives a LED load during the normal operation mode, while the battery of the emergency lighting driver is being pulse charged, the light emitted by the LED load may show a flicker, i.e. a visible fluctuation in the intensity of the light emitted by the LED load.

Namely, due to the connecting and disconnecting of the battery to respectively from the normal electrical energy source as a result of switching the switch in series to the battery during the pulse charging, the electrical energy, in particular the current, that is supplied to the LED load may rapidly increase, i.e. overshoot, or rapidly decrease, i.e. undershoot, causing the flicker.

Even in case a LED driver is present in the emergency lighting driver device for feedback-controlling the current flowing through the LED load, the flicker occurs, as the feedback control is typically too slow in order to react to the overshooting or undershooting caused by the connecting and disconnecting of the battery to respectively from the normal electrical energy source.

Therefore, it is an object of the present invention to provide an emergency lighting driver device that is configured to pulse charge its battery during the normal operation mode, while driving a LED load at the same time, such that the light emitted by the LED load does not show a flicker or respectively the flicker of the emitted light is reduced. In other words, it is an object of the present invention to overcome the above described problem when pulse charging the battery of an emergency lighting driver device during the normal operation mode, while a LED load is driven by the emergency lighting driver device.

This and other objects, which become apparent upon reading the following description, are solved by the invention.

SUMMARY OF THE INVENTION

According to a first preferred alternative of the present invention, an emergency lighting driver device for driving a lighting unit comprising at least one emergency lighting source, preferably a LED unit comprising at least one LED, is provided, wherein the emergency lighting driver device comprises: an input terminal being configured to be supplied with a supply voltage; a battery connected in series to a transistor, wherein the series connection of the battery and the transistor is directly or indirectly connected in parallel to the input terminal, such that the battery is chargeable starting from the supply voltage; a LED driver connected in parallel to the series connection of the battery and the transistor, the LED driver having an output terminal for driving a LED load; and a control unit being configured to feedback-control the current through the LED load by controlling the LED driver and being configured to apply a pulse signal to the transistor for controlling the charging of the battery. The emergency lighting driver device according to the first alternative of the present invention is configured to assume an operation mode in which: the battery is charged by applying the pulse signal to the transistor from the control unit, while the LED load is driven; and the emergency lighting driver device is configured to delay the pulse signal such that the rising edge(s) and/or falling edge(s) of the pulse signal have a transition time of at least 0.5 seconds, preferably at least 1 second, more preferred more than 1.5 seconds and preferably less than 3 seconds.

In other words, according to the first preferred alternative of the present invention, the emergency lighting driver device is configured to charge its battery, while driving a LED load, and to delay the pulse signal for controlling the charging of the battery, in particular for controlling the switching of the transistor, such that the rising edge(s) and/or the falling edge(s) of the pulse signal have a transition time of at least 0.5 second, preferably at least 1 second, more preferred more than 1.5 seconds and preferably less than 3 seconds.

Due to the delaying of the pulse signal such that the rising edge(s) and/or falling edge(s) of the pulse signal have a transition time of at least 0.5 second, preferably at least 1 second, more preferred more than 1.5 seconds and preferably less than 3 seconds, the transistor is not suddenly or rapidly switched on respectively off. That is, when the transistor is switched from the conducting state to the non-conducting state, the conductivity of the transistor is slowly decreased during the transition time of the respective falling or rising edge. When the transistor is switched from the non-conducting state to the conducting state, the conductivity of the transistor is slowly increased during the transition time of the respective rising or falling edge. Thus, the switching of the transistor does not cause the voltage at the input terminal, which is used for driving the LED load while charging the battery, to rapidly increase respectively decrease. As a result, the feedback-control of the current through the LED load, in view of its response time, is able to adapt to the changing voltage level of the voltage at the input terminal caused by the pulse signal for charging the battery. Therefore, the emergency lighting driver device according to the first alternative of the present invention may reduce or prevent flicker of the light emitted by the LED load.

Depending on the type of the transistor, the rising edge(s) may turn the transistor on and the falling edge(s) may turn the transistor off or the rising edge(s) may turn the transistor off and the falling edge(s) may turn the transistor on.

In the context of the present invention, the term "emergency lighting driver device" is a lighting driver device that is configured

- to drive the lighting unit comprising at least one emergency lighting source with the electrical energy stored in its battery in the emergency operation mode,
- to drive the lighting unit with electrical energy provided to its input terminal from the normal electrical energy source, e.g. mains, in the normal operation mode, and
- to charge its battery with electrical energy provided to its input terminal from the normal electrical energy source, while driving the lighting unit with the electrical energy provided to its input from the normal electrical energy source, in the normal operation mode.

The emergency lighting driver device may also charge its battery in the normal operation mode, without driving the lighting unit at the same time.

The normal operation mode preferably corresponds to the operation mode, when the emergency lighting driver device is supplied via its input terminal with electrical energy from a normal electrical energy source, such as e.g. mains or an electrical energy supply bus. The emergency operation mode preferably corresponds to the operation mode, when the emergency lighting driver device drives the lighting unit with electrical energy stored in its battery, as no or not sufficient electrical energy for driving the lighting unit is supplied via the input terminal to the emergency lighting driver device from the normal electrical energy source due to an emergency event. An example for an emergency event may be a fire disturbing or interrupting the normal electrical energy source or an interruption of the normal electrical energy source due to a black-out caused by the public utility company.

Preferably, the emergency lighting driver device is configured to start the emergency operation mode as a result of detecting a drop in the electrical energy respectively voltage supplied from the normal electrical energy source to its input terminal.

During the normal operation mode the emergency lighting driving device drives the lighting unit with electrical energy from the normal electrical energy source, e.g. mains, and during the emergency operation mode the emergency lighting driver device drives the lighting unit with electrical energy from its battery.

The supply voltage is preferably supplied to the first terminal of the emergency lighting driver device from a normal electrical energy source respectively normal voltage source, such as mains.

The series connection of the battery and the transistor is preferably indirectly connected in parallel to the input terminal via a driver circuit that is configured to convert the supply voltage supplied to the input terminal into a voltage for charging the battery. Preferably, the driver circuit comprises at least one switched converter that is configured to convert the supply voltage into a voltage for charging the battery.

Preferably, such a switched converter corresponds to a converter with a galvanic isolation, such as flyback-converter, push-pull-converter, resonant converter etc., or a converter without a galvanic isolation, such as a buck-converter, boost-converter, buck-boost-converter etc.

Preferably, the LED load corresponds to at least one LED.

The control unit is preferably a microcontroller, an ASIC or a hybrid thereof.

Preferably, the control unit is configured to delay the pulse signal such that the rising edge(s) and/or falling edge(s) of the pulse signal have a transition time of at least 0.5 seconds, preferably at least 1 second, more preferred more than 1.5 seconds and preferably less than 3 seconds.

Preferably, the LED driver is any circuit, such as e.g. a switched converter or a linear regulator circuit, that is controllable by the control unit for driving a LED load.

According to the present invention the "feedback-control of the current through the LED load" may be carried out by any method known to the skilled person. The emergency lighting driver device may comprise the means, such as e.g. a shunt resistor for detecting the current fed to the LED load, for carrying out such a feedback-control and/or may receive the information needed therefore from extern.

In the context of the present invention, the term "pulse signal" is a signal with one pulse or a plurality of consecutive pulses, wherein each pulse of the pulse signal comprises a rising edge and a falling edge. Preferably, the emergency lighting driver device is configured to delay the pulse signal such that the rising edge and/or falling edge of at least one pulse of the pulse signal has a transition time of at least 0.5 seconds, preferably at least 1 second, more preferred more than 1.5 seconds and preferably less than 3 seconds.

Preferably, the emergency lighting driver device is configured to delay the pulse signal such that the rising edge and/or falling edge of each pulse has a transition time of at least 0.5 seconds, preferably at least 1 second, more preferred more than 1.5 seconds and preferably less than 3 seconds. However, the term "each pulse" has to be understood as "substantially each pulse", i.e. it is possible that one or more of the pulses of the pulse signal are outliers having a different transition time for the rising edge and/or falling edge.

In the context of the present invention, a "pulse" corresponds to a control signal that is able to switch a transistor, preferably control signal with a substantially vertical (when seen on the time axis) rising edge and a falling edge.

For describing the present invention, it is assumed that the rising edge of the pulse turns the transistor on, i.e. switches the transistor into the conducting state, and the falling edge of the pulse turns the transistor off, i.e. switches the transistor into the non-conducting state. However, as mentioned already above, it depends on the transistor type whether the rising edge of the pulse turns the transistor on and the falling edge turns the transistor off or the rising edge of the pulse turns the transistor off and the falling edge turns the transistor on.

Preferably, the pulses of the pulse signal have the same amplitude and pulse duration. However, the pulses of the pulse signal may also have different amplitudes and/or pulse durations. Preferably the time respectively duration between the pulses of the pulse signal is different to the pulse duration of the pulses.

Furthermore, the emergency lighting driver device is preferably configured to charge the battery during the normal operation mode starting from the supply voltage supplied from a normal electrical energy source, such as mains, to the input terminal of the emergency lighting driver device.

For charging the battery the control unit is preferably configured to control the switching of the transistor by applying a pulse signal to the transistor.

When the transistor is in the conducting state, then the battery is charged starting from the supply voltage supplied to the input terminal of the emergency lighting driver device, and when the transistor is in the non-conducting state, the battery is not charged.

Preferably, the emergency lighting driver device according to the first preferred alternative of the present invention comprises a low pass filter unit configured to delay the transition time of the rising edge(s) and/or falling edge(s) of the pulse signal before feeding it to the transistor.

Preferably, the control unit comprises the low pass filter unit that is configured to delay the transition time of the rising edge(s) and/or falling edge(s) of the pulse signal before feeding it to the transistor.

According to a second preferred alternative of the present invention an emergency lighting driver device for driving a lighting unit comprising at least one emergency lighting source, preferably a LED unit comprising at least one LED, is provided, wherein the emergency lighting driver device comprises an input terminal being configured to be supplied with a supply voltage; a battery connected in series to a transistor, wherein the series connection of the battery and the transistor is directly or indirectly connected in parallel to the input terminal, such that the battery is chargeable starting from the supply voltage; a LED driver connected in parallel to the series connection of the battery and the transistor, the LED driver having an output terminal for driving a LED load; and a control unit being configured to feedback-control the current through the LED load by controlling the LED driver and being configured to apply a pulse signal to the transistor for controlling the charging of the battery. The emergency lighting driver device according to the second preferred alternative of the present invention is configured to assume an operation mode in which: the battery is charged by applying the pulse signal to the transistor from the control unit, while the LED load is driven; and the pulse signal is fed through a low pass filter unit of the emergency lighting driver device delaying the transition time of the rising edge(s) and/or falling edge(s) of the pulse signal before feeding it to the transistor.

In other words, according to the second preferred alternative of the present invention, the emergency lighting driver device comprises a low pass filter unit that is configured to delay the transition time of the rising edge(s) and/or the falling edge(s) of the pulse signal for controlling the charging of the battery, in particular for controlling the switching of the transistor, before the pulse signal is fed to the transistor.

Due to the delaying of the transition time of the rising edge(s) and/or falling edge(s) of the pulse signal, before feeding the pulse signal to the transistor, the transistor is not suddenly or rapidly switched on respectively off. That is, when the transistor is switched from the conducting state to the non-conducting state, the conductivity of the transistor is slowly decreased during the transition time of the respective rising or falling edge. When the transistor is switched from the non-conducting state to the conducting state, the conductivity of the transistor is slowly increased during the transition time of the respective rising or falling edge. Thus, the switching of the transistor does not cause the voltage at the input terminal, which is used for driving the LED load while charging the battery, to rapidly increase respectively decrease. As a result, in view of its response time, the feedback-control of the current through the LED load is able to adapt to the changing voltage level of the voltage at the input terminal caused by the pulse signal for charging the battery. Therefore, the emergency lighting driver device according to the second alternative of the present invention may reduce or prevent flicker of the light emitted by the LED load.

Preferably, the control unit comprises the low pass filter unit that is configured to delay the transition time of the rising edge(s) and/or falling edge(s) of the pulse signal before feeding it to the transistor.

Preferably, the low pass filter unit of the emergency lighting driver device according to the second preferred alternative of the present invention is configured to delay the pulse signal such that the rising edge(s) and/or falling edge(s) of the pulse signal have a transition time of at least 0.5 seconds, preferably at least 1 second, more preferred more than 1.5 seconds and preferably less than 3 seconds.

The following optional features are applicable for both, above described, alternatives of the present invention:

Preferably, the low pass filter unit comprises at least one RC-element.

Further, the LED driver preferably comprises at least one switched converter, and the control unit is preferably configured to feedback-control the current through the LED load by adapting the switching of the at least one switched converter.

In other words, the LED driver comprises at least one converter with at least one switch, wherein the current through the LED load may be feedback-controlled to a nominal value by controlling the switching of the at least one switch. Preferably, the LED driver comprises one switched converter.

Preferably, the at least one switched converter corresponds to a converter with a galvanic isolation, such as flyback-converter, push-pull-converter, resonant converter etc., or a converter without a galvanic isolation, such as a buck-converter, boost-converter, buck-boost-converter etc.

Furthermore, the emergency lighting driver device is preferably configured to delay the pulse signal (and to have a feedback control with a matched time response) such that the current through the LED load, being feedback-controlled by the control unit, is within 30%, preferably 20%, more preferred 10%, even more preferred 5% of the nominal value for the current through the LED load.

Moreover, the transistor is preferably a MOSFET and the control unit is preferably configured to apply the pulse signal to the gate-terminal of the MOSFET.

The transistor may also be another transistor type, such as e.g. a bipolar transistor.

Preferably, the emergency lighting driver device is configured to delay the pulse signal such that the MOSFET is driven through its active region during the transition time of the rising edge(s) and/or falling edge(s) of the pulse signal.

That is, preferably, when the MOSFET is switched from the conducting state to the non-conducting state, the MOSFET drives through its active region during the transition time of the respective rising or falling edge, wherein the conductivity of the MOSFET decreases as the MOSFET drives through its active region. Preferably, when the MOSFET is switched from the non-conducting state to the conducting state, the MOSFET drives through its active region during the transition time of the respective rising or falling edge, wherein the conductivity of the MOSFET increases as the MOSFET drives through its active region.

Further, for charging the battery the control unit is preferably configured to control the transistor according to a pulse charge method.

Preferably, for charging the battery the control unit is configured to control the transistor such that the transistor is alternately switched between the conducting state and the non-conducting state; the transistor is in the conducting state for a predetermined conducting time and in the non-conducting state for a predetermined non-conducting time; and the predetermined non-conducting time is longer than the predetermined conducting time.

As described already above, when the transistor is in the conducting state then the battery is charged with electrical energy starting from the supply voltage supplied to the input terminal of the emergency lighting driver device. When the transistor is in the non-conducting state the battery is not charged with electrical energy.

Preferably, the predetermined conducting time corresponds to 2 to 6 minutes, preferably 3 to 5 minutes and the predetermined non-conducting time corresponds to 10 to 25 minutes, preferably 13 to 19 minutes.

Preferably, for charging the battery the control unit is configured to control the transistor such that the transistor is in the conducting state for a predetermined initial conducting time before being alternately switched between the conducting state and the non-conducting state; and the predetermined initial conducting time is longer than the predetermined non-conducting time.

The predetermined initial conducting time preferably corresponds to 15 to 25 hours.

Furthermore, according to the present invention an emergency lighting device is provided, wherein the emergency lighting device comprises an emergency lighting driver device according to the present invention, as described above, and a lighting unit comprising at least one emergency lighting source, preferably a LED unit comprising at least one LED. The emergency lighting driver device is configured to drive the lighting unit starting from a voltage supply via its input terminal in a normal operation mode and to drive the lighting unit starting from the battery in an emergency operation mode.

Moreover, according to the present invention a method for charging the battery of an emergency lighting driver device according to the present invention, as described above, is provided; wherein the battery is charged by applying the pulse signal to the transistor from the control unit, while the LED load is driven, and the emergency lighting driver device delays the pulse signal such that the rising edge(s) and/or falling edge(s) of the pulse signal have a transition time of at least 0.5 seconds, preferably at least 1 second, more preferred more than 1.5 seconds and preferably less than 3 seconds.

In addition, according to the present invention a further method for charging the battery of an emergency lighting driver device according to the present invention, as described above, is provided; wherein the battery is charged by applying the pulse signal to the transistor from the control unit, while the LED load is driven, and the pulse signal is fed through a low pass filter unit of the emergency lighting driver device delaying the transition time of the rising edge(s) and/or falling edge(s) of the pulse signal before feeding it to the transistor.

According to the present invention, the above optional features may be arbitrarily combined.

BRIEF DESCRIPTION OF THE DRAWINGS

In the following, the invention is described exemplarily with reference to the enclosed figures. The figures merely show preferred embodiments of the present invention. Same elements in the figures are referenced by same reference signs. In detail.

DETAILED DESCRIPTION OF A PREFERRED EMBODIMENT

Figure 1:
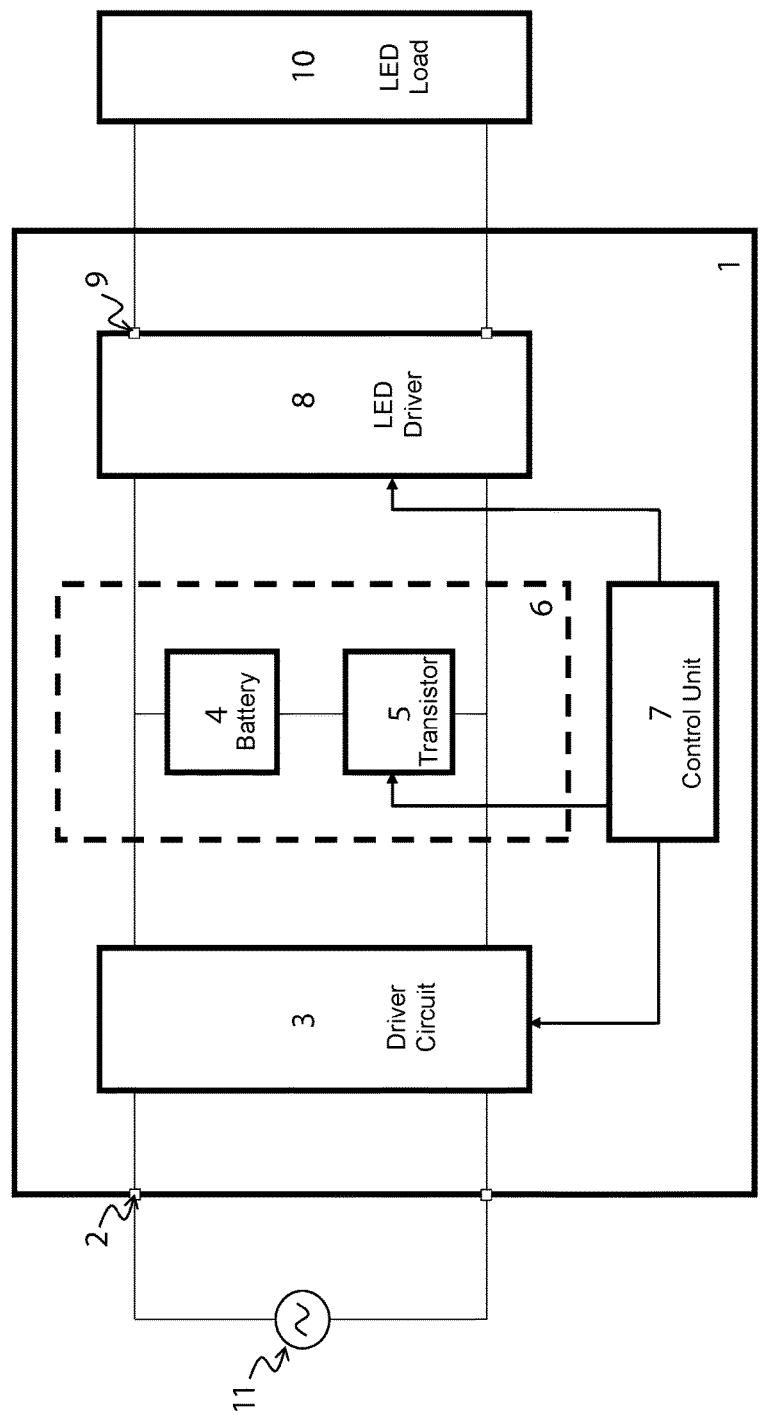
FIG. 1 is a schematic view of a circuit diagram of an emergency lighting driver device according to a preferred embodiment of the invention.

FIG. 1 is a schematic view of a circuit diagram of an emergency lighting driver device according to a preferred embodiment of the invention.

The emergency lighting driver device 1, shown in FIG. 1, comprises an input terminal 2, a driver circuit 3, a series connection 6 of a battery 4 and a transistor 5, a control unit 7 and a LED driver 8. The series connection 6 of the battery 4 and the transistor 5 is indirectly connected via the driver circuit 3 in parallel to the input terminal 2. Preferably, the series connection 6 of the battery 4 and the transistor 5 may also be directly connected in parallel to the input terminal 2 (not shown in FIG. 1). That is, the emergency lighting driver device may not comprise the driver circuit 3.

The LED driver 8 is connected in parallel to the series connection 6 of the battery 4 and the transistor 5.

The LED driver 8 is configured to drive via its output terminal 9 a LED load 10, which may be a lighting unit 10 with at least one emergency lighting source, in particular a LED unit comprising at least one LED. That is, the emergency lighting driver device 1 is configured to drive the lighting unit 10 comprising at least one emergency lighting source, preferably a LED unit comprising at least one LED.

The emergency lighting driver device 1 and the lighting unit 10 may form together an emergency lighting device.

The emergency lighting driver device 1 is configured to drive the lighting unit 10 with electrical energy provided by a normal energy source 11 respectively voltage source, such as mains, or provided by the battery 4. As mentioned already above, the operation mode when the emergency lighting driver device 1 is supplied with electrical energy via its input terminal 2 from a normal energy source 11 for driving the lighting unit 10 is called normal operation mode. The operation mode when the emergency lighting driver device 1 is not supplied with electrical energy via its input terminal 2 or is not supplied with sufficient electrical energy for driving the lighting unit 10 is called emergency operation mode. In the emergency operation mode the electrical energy stored in the battery 4 is used for driving the lighting unit 10, in particular the at least one emergency lighting source.

The driver circuit 3 is configured to convert the voltage supplied to the input terminal 2 of the emergency lighting driver device 1 into a voltage suitable for charging the battery 4.

The LED driver 8 comprises an output terminal 9 for driving a LED load, such as the lighting unit 10. The LED driver 8 preferably comprises at least one switched converter configured to provide the electrical energy, in particular the current, for driving the lighting unit 10. The LED driver 8 is preferably controllable by the control unit 7 in order to drive the lighting unit 10 starting from the output voltage of the driving circuit 3 (during the normal operation mode and in case the driving circuit 3 is present), the voltage at the input terminal 2 (during the normal operation mode and in case the driving circuit 3 is not present) or the voltage provided by the battery 4 (during the emergency operation mode).

The control unit 7 is preferably configured to control the driver circuit 3, the switching of the transistor 5 and the LED driver 8.

In particular, the control unit 7 is preferably configured to control the conversion of the voltage at the input terminal 2 by the driver circuit 3 into a voltage at the output of the driver circuit 3, which is suitable for charging the battery and/or driving the lighting unit 10.

The control unit 7 is preferably configured to feedback-control the current flowing through the lighting unit 10 representing a LED load by controlling the LED driver 8. In case the LED driver 8 comprises at least one switched converter, the control unit is configured to feedback-control the current through the LED load 10 by adapting respectively controlling the switching of the at least one switched converter.

The control unit 7 is configured to control the switching of the transistor 5 by applying a pulse signal to the transistor 5 in order to control the charging of the battery 4. In case the transistor 5 is turned off, i.e. in the non-conducting state, the battery 4 is not charged with electrical energy. In case the transistor 5 is turned on, i.e. in the conducting state, the battery 4 is charged with electrical energy starting from the output voltage of the driving circuit 3 (during the normal operation mode and in case the driving circuit 3 is present) or the voltage at the input terminal 2 (during the normal operation mode and in case the driving circuit 3 is not present).

The emergency lighting driver device 1, preferably the control unit 7, is configured to delay the pulse signal such that the rising edge(s) and/or falling edge(s) of the pulse signal have a transition time of at least 0.5 seconds, preferably at least 1 second, more preferred more than 1.5 seconds and preferably less than 3 seconds.

Preferably the control unit 7 comprises a low pass filter unit (not shown in FIG. 1) that is configured to delay the transition time of the rising edge(s) and/or falling edge(s) of the pulse signal before feeding it to the transistor 5.

Figure 2:
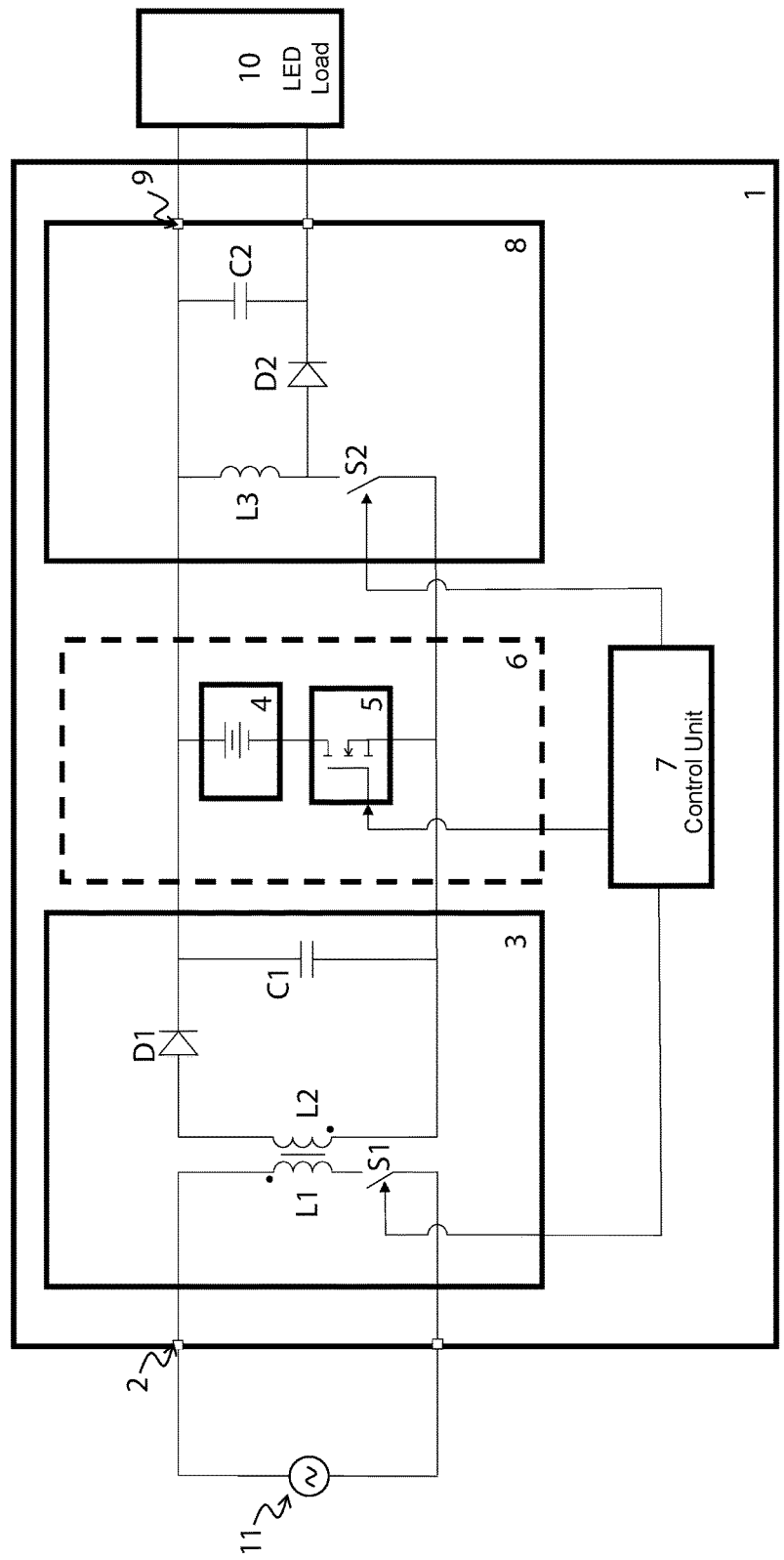
FIG. 2 is a further schematic view of a circuit diagram of an emergency lighting driver device according to the preferred embodiment of the invention shown in FIG. 1, wherein the schematic view of FIG. 2 is more detailed in comparison to the schematic view of FIG. 1.

FIG. 2 is a further schematic view of a circuit diagram of an emergency lighting driver device according to the preferred embodiment of the invention shown in FIG. 1, wherein the schematic view of FIG. 2 is more detailed in comparison to the schematic view of FIG. 1.

The emergency lighting driver device 1 shown in FIG. 2 substantially corresponds to the emergency lighting driver device 1 shown in FIG. 1, wherein the driver circuit 3, the transistor 5 and the LED driver 8 are shown in more detail.

The driver circuit 3 comprises a flyback-converter that provides a galvanic isolation between the input terminal 2 and the series connection 6 of the battery 4 and the transistor 5. As already mentioned above, the driver circuit 3 may be implemented differently or may be fully omitted, such that the series connection 6 of the battery 4 and the transistor 5 is directly connected in parallel to the input terminal 2.

The flyback-converter of the driver circuit 3 comprises a switch S1, a transformer with the primary winding L1 and the secondary winding L2, a diode D1 and a capacitor C1. The control unit 7 is preferably configured to control the voltage provided at the capacitor C1 starting from the voltage at the input terminal 2, i.e. control the conversion of the voltage at the input terminal 2 to the voltage at the capacitor C1.

The LED driver 8 comprises one switched converter in the form of a buck-boost converter. As already mentioned above, the LED driver may be implemented differently.

The buck-boost converter comprises a switch S2, an inductor L1, a diode D2 and a capacitor C2. The control unit 7 is configured to control the switching of the switch S2 in order to feedback-control the current through the lighting unit 10, representing a LED load. The means needed besides the switch S2 for feedback-controlling the current trough the lighting unit 10 are not shown in FIG. 2.

The transistor 5 corresponds to a MOSFET (metal-oxide-semiconductor field-effect-transistor), wherein the control unit 7 is configured to apply the pulse signal for controlling the charging of the battery 4 to the gate-terminal of the MOSFET. As already mentioned above, the transistor 5 may also be implemented differently.

Figure 3:
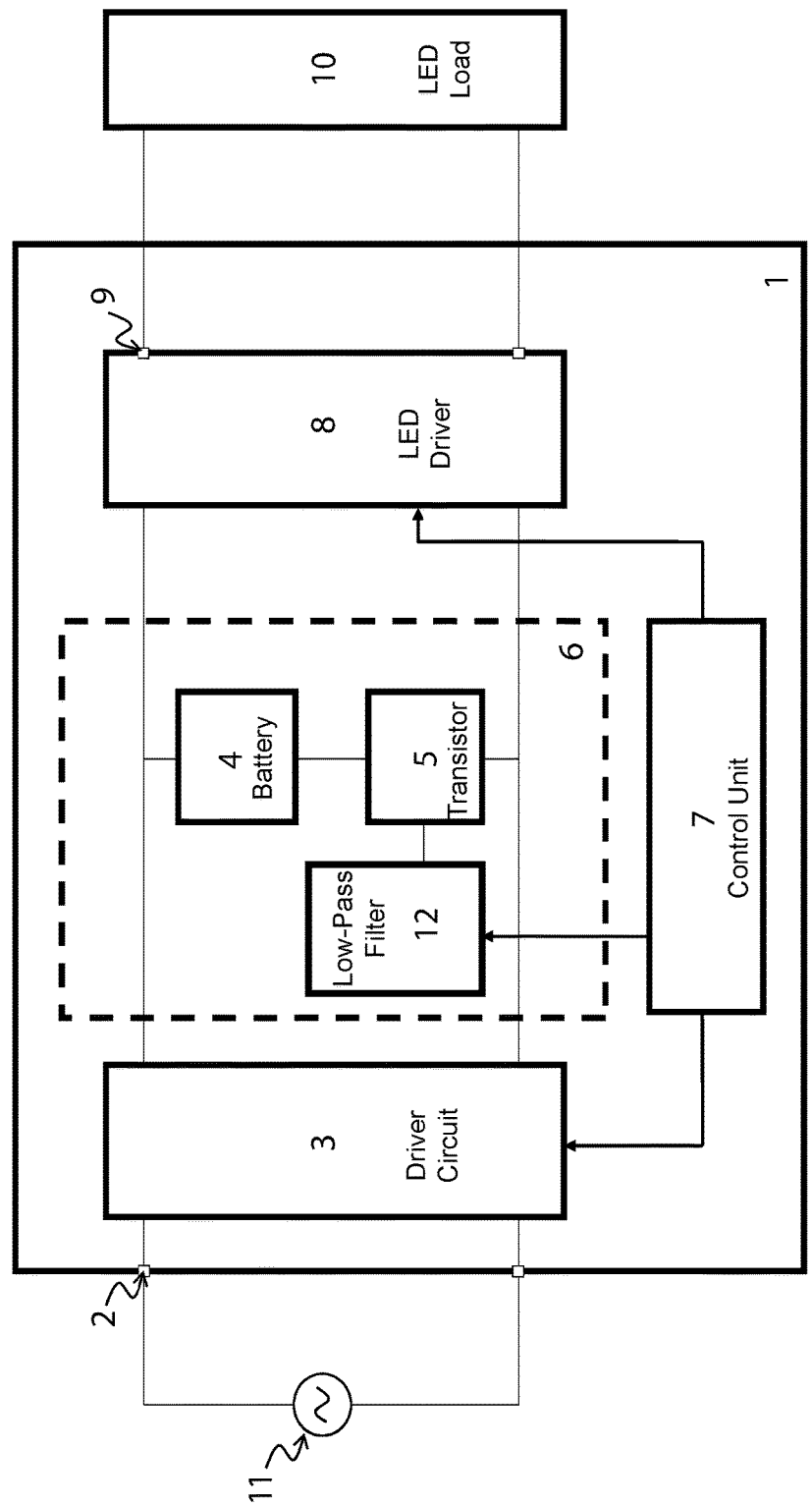
FIG. 3 is a schematic view of a circuit diagram of an emergency lighting driver device according to a further preferred embodiment of the invention.

FIG. 3 is a schematic view of a circuit diagram of an emergency lighting driver device according to a further preferred embodiment of the invention.

The emergency lighting driver device 1 shown in FIG. 3 substantially corresponds to the emergency lighting driver device 1 shown in FIG. 1. Thus, the description with respect to FIG. 1 is also valid for the emergency lighting driver device shown in FIG. 3 and in the following merely the differences between these two preferred embodiments will be described.

With respect to the emergency lighting driver device 1 according to the preferred embodiment shown in FIG. 1, the emergency lighting driver device 1 according to the preferred embodiment shown in FIG. 3 additionally comprises a low pass filter unit 12.

The low pass filter unit 12 is configured to delay the transition time of the rising edge(s) and/or falling edge(s) of the pulse signal, provided from the control unit 7 for controlling the transistor, before feeding the pulse signal to the transistor 5.

Preferably, the low pass filter unit 12 is configured to delay the pulse signal such that the rising edge(s) and/or falling edge(s) of the pulse signal have a transition time of at least 0.5 seconds, preferably at least 1 second, more preferred more than 1.5 seconds and preferably less than 3 seconds.

Figure 4:
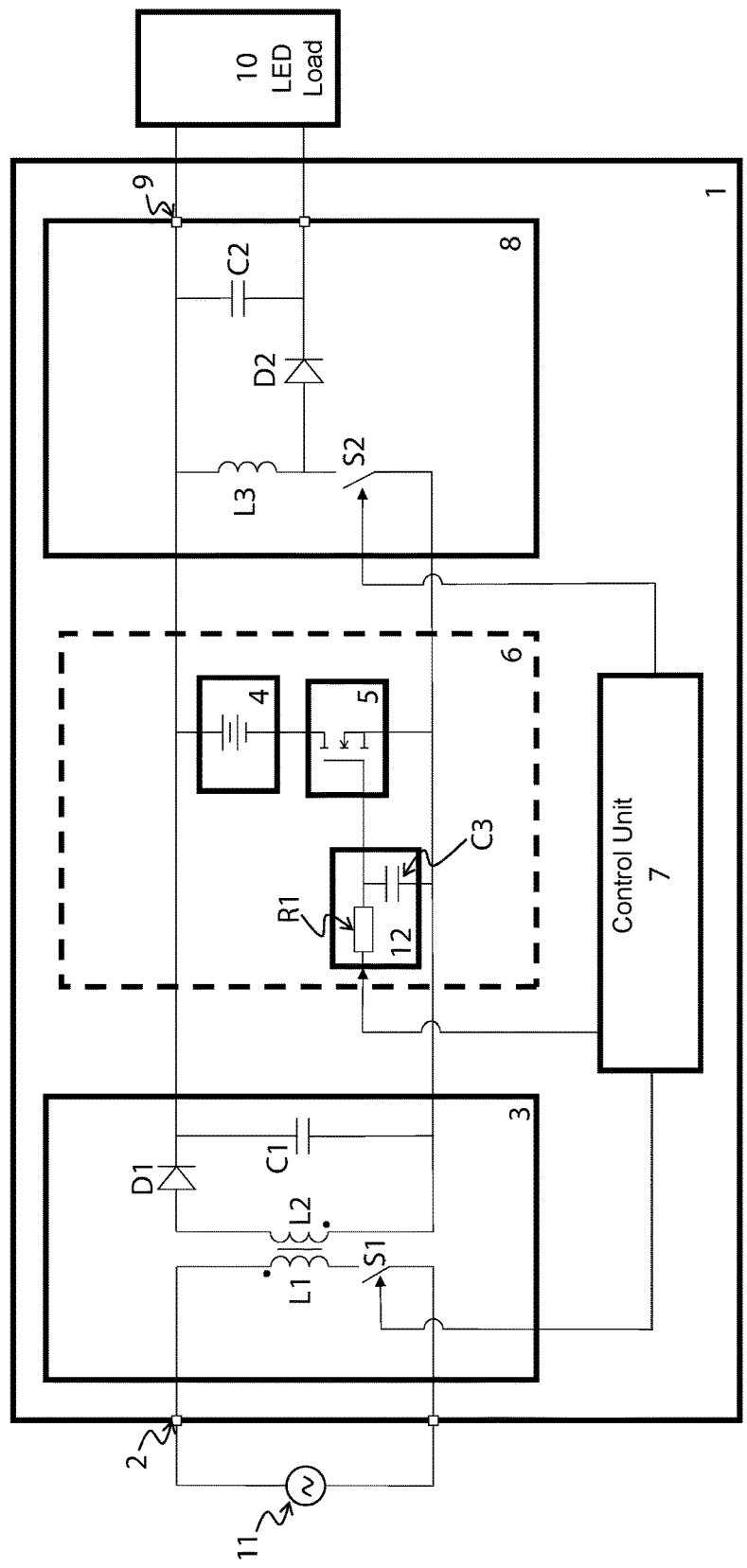
FIG. 4 is a further schematic view of a circuit diagram of an emergency lighting driver device according to the preferred embodiment of the invention shown in FIG. 3, wherein the schematic view of FIG. 4 is more detailed in comparison to the schematic view of FIG. 3.

FIG. 4 is a further schematic view of a circuit diagram of an emergency lighting driver device according to the preferred embodiment of the invention shown in FIG. 3, wherein the schematic view of FIG. 4 is more detailed in comparison to the schematic view of FIG. 3.

The emergency lighting driver device 1 shown in FIG. 4 substantially corresponds to the emergency lighting driver device shown in FIG. 3, wherein the driver circuit 3, the transistor 5, the LED driver 8 and the low pass filter unit 12 are shown in more detail.

The driver circuit 3, the transistor 5 and the LED driver 8 of the emergency lighting driver unit 1 of FIG. 4 are implemented in the same way as the driver circuit 3, the transistor 5 and the LED driver 8 of the emergency lighting driver unit 1 of FIG. 2. Thus, please refer to the corresponding description of FIG. 2 with respect to the implementation of the driver circuit 3, the transistor 5 and the LED driver 8 of the emergency lighting driver unit 1 of FIG. 4.

The low pass filter unit 12 shown in FIG. 4 comprises a RC-element with one resistor R1 and one capacitor C3. The low pass filter unit 12 may also be implemented differently. For example the low pass filter unit 12 may also comprise more than one RC-element.

To sum up, the present invention focuses on describing an advantageous emergency lighting driver device compared to the state of the art that is configured to charge its battery during the normal operation mode, while driving a LED load at the same time. In particular, the present invention focuses on describing the control of the charging of the battery using a pulse signal for performing a pulse charging. Thus, the feedback-control of the current through the LED load by the LED driver of the emergency lighting driver device and the voltage conversion performed by the optional driver circuit connected between the input terminal and the series connection of the battery and the transistor are only schematically described herein and may be implemented in one way or another known to the skilled person.

The invention claimed is:

1. An emergency lighting driver device (1) for driving a lighting unit (10) comprising at least one emergency lighting source with a LED unit comprising at least one LED, wherein the emergency lighting driver device (1) comprises
    a) an input terminal (2) being configured to be supplied with a supply voltage (11),
    b) a battery (4) connected in series to a transistor (5), wherein the series connection (6) of the battery (4) and the transistor (5) is directly or indirectly connected in parallel to the input terminal (2), such that the battery (4) is chargeable starting from the supply voltage (11),
    c) a LED driver (8) connected in parallel to the series connection (6) of the battery (4) and the transistor (5), the LED driver (8) having an output terminal (9) for driving a LED load (10), and
    d) a control unit (7) being configured to feedback-control the current through the LED load (10) by controlling the LED driver (8) and being configured to apply a pulse signal to the transistor (5) for controlling the charging of the battery (4),
    e) wherein the emergency lighting driver device (1) is configured to assume an operation mode in which:
        the battery (4) is charged by applying the pulse signal to the transistor (5) from the control unit (7), while the LED load (10) is driven, and
        the emergency lighting driver device (1) is configured to delay the pulse signal such that the rising edge(s) and/or falling edge(s) of the pulse signal have a transition time of at least 0.5 seconds.

2. An emergency lighting driver device (1) according to claim 1, wherein the emergency lighting driver device (1) comprises a low pass filter unit (12) configured to delay the transition time of the rising edge(s) and/or falling edge(s) of the pulse signal before feeding it to the transistor (5).

3. An emergency lighting driver device (1) according to claim 2, wherein the low pass filter unit (12) comprises at least one RC-element (R1, C3).

4. An emergency lighting driver device (1) according to claim 1, wherein the emergency lighting driver device (1) is configured to delay the pulse signal such that the rising edge(s) and/or falling edge(s) of the pulse signal have a transition time of at least 1.0 seconds and less than 3 seconds.

5. An emergency lighting driver device (1) according to claim 1, wherein
    the LED driver (8) comprises at least one switched converter (S2, L3, D2, C2), and the control unit (7) is configured to feedback-control the current through the LED load (10) by adapting the switching of the at least one switched converter (S2, L3, D2, C2).

6. An emergency lighting driver device (1) according to claim 1, wherein the emergency lighting driver device (1) is configured to delay the pulse signal such that the current through the LED load (10) being feedback-controlled by the control unit (7) is within 10% of the nominal value for the current through the LED load (10).

7. An emergency lighting driver device (1) according to claim 1, wherein the transistor (5) is a MOSFET and the control unit (7) is configured to apply the pulse signal to the gate-terminal of the MOSFET.

8. An emergency lighting driver device (1) according to claim 1, wherein
for charging the battery (4) the control unit (7) is configured to control the transistor (5) such that the transistor (5) is alternately switched between the conducting state and the non-conducting state,
the transistor (5) is in the conducting state for a predetermined conducting time and in the non-conducting state for a predetermined non-conducting time, and
the predetermined non-conducting time is longer than the predetermined conducting time.

9. An emergency lighting driver device (1) according to claim 8, wherein the predetermined conducting time corresponds to 4 minutes and the predetermined non-conducting time corresponds to 16 minutes.

10. An emergency lighting driver device (1) according to claim 8, wherein
for charging the battery (4) the control unit (7) is configured to control the transistor (5) such that the transistor (5) is in the conducting state for a predetermined initial conducting time before being alternately switched between the conducting state and the non-conducting state, and
the predetermined initial conducting time is longer than the predetermined non-conducting time.

11. An emergency lighting driver device (1) according to claim 10, wherein the predetermined initial conducting time corresponds to 20 hours.

12. An emergency lighting device comprising
an emergency lighting driver device (1) according to claim 1, and
a lighting unit (10) comprising at least one emergency lighting source with a LED unit comprising at least one LED,
wherein the emergency lighting driver device (1) is configured to drive the lighting unit (10) starting from a voltage supply (11) via its input terminal (2) in a normal operation mode and to drive the lighting unit (10) starting from the battery (4) in an emergency operation mode.

13. An emergency lighting driver device (1) for driving a lighting unit (10) comprising at least one emergency lighting source with a LED unit comprising at least one LED, wherein the emergency lighting driver device (1) comprises
a) an input terminal (2) being configured to be supplied with a supply voltage (11),
b) a battery (4) connected in series to a transistor (5), wherein the series connection (6) of the battery (4) and the transistor (5) is directly or indirectly connected in parallel to the input terminal (2), such that the battery (4) is chargeable starting from the supply voltage (11),
c) a LED driver (8) connected in parallel to the series connection (6) of the battery (4) and the transistor (5), the LED driver (8) having an output terminal (9) for driving a LED load (8), and
d) a control unit (7) being configured to feedback-control the current through the LED load (10) by controlling the LED driver (8) and being configured to apply a pulse signal to the transistor (5) for controlling the charging of the battery (4),
e) wherein the emergency lighting driver device (1) is configured to assume an operation mode in which:
the battery (4) is charged by applying the pulse signal to the transistor (5) from the control unit (7), while the LED load (10) is driven, and
the pulse signal is fed through a low pass filter unit (12) of the emergency lighting driver device (1) delaying the transition time of the rising edge(s) and/or falling edge(s) of the pulse signal before feeding it to the transistor (5).

14. An emergency lighting driver device (1) according to claim 13, wherein the low pass filter unit (12) is configured to delay the pulse signal such that the rising edge(s) and/or falling edge(s) of the pulse signal have a transition time of at least 0.5 seconds.

15. An emergency lighting driver device (1) according to claim 13, wherein the low pass filter unit (12) comprises at least one RC-element (R1, C3).

16. An emergency lighting driver device (1) according to claim 13, wherein
the LED driver (8) comprises at least one switched converter (S2, L3, D2, C2), and
the control unit (7) is configured to feedback-control the current through the LED load (10) by adapting the switching of the at least one switched converter (S2, L3, D2, C2).

17. An emergency lighting driver device (1) according to claim 13, wherein the emergency lighting driver device (1) is configured to delay the pulse signal such that the current through the LED load (10) being feedback-controlled by the control unit (7) is within 10% of the nominal value for the current through the LED load (10).

18. An emergency lighting driver device (1) according to claim 13, wherein the transistor (5) is a MOSFET and the control unit (7) is configured to apply the pulse signal to the gate-terminal of the MOSFET.

19. An emergency lighting driver device (1) according to claim 18, wherein the emergency lighting driver device (1) is configured to delay the pulse signal such that the MOSFET is driven through its active region during the transition time of the rising edge(s) and/or falling edge(s) of the pulse signal.

20. An emergency lighting driver device (1) according to claim 18, wherein the emergency lighting driver device (1) is configured to delay the pulse signal such that the MOSFET is driven through its active region during the transition time of the rising edge(s) and/or falling edge(s) of the pulse signal.

21. An emergency lighting driver device (1) according to claim 13, wherein
for charging the battery (4) the control unit (7) is configured to control the transistor (5) such that the transistor (5) is alternately switched between the conducting state and the non-conducting state,
the transistor (5) is in the conducting state for a predetermined conducting time and in the non-conducting state for a predetermined non-conducting time, and
the predetermined non-conducting time is longer than the predetermined conducting time.

22. An emergency lighting driver device (1) according to claim 21, wherein the predetermined conducting time corresponds to 4 minutes and the predetermined non-conducting time corresponds to 16 minutes.

23. An emergency lighting driver device (1) according to claim 21, wherein for charging the battery (4) the control unit (7) is configured to control the transistor (5) such that the transistor (5) is in the conducting state for a predetermined initial conducting time before being alternately switched between the conducting state and the non-conducting state, and the predetermined initial conducting time is longer than the predetermined non-conducting time.

24. An emergency lighting driver device (1) according to claim 23, wherein the predetermined initial conducting time corresponds to 20 hours.

25. An emergency lighting device comprising
an emergency lighting driver device (1) according to claim 13, and
a lighting unit (10) comprising at least one emergency lighting source with a LED unit comprising at least one LED,
wherein the emergency lighting driver device (1) is configured to drive the lighting unit (10) starting from a voltage supply (11) via its input terminal (2) in a normal operation mode and to drive the lighting unit (10) starting from the battery (4) in an emergency operation mode.

26. An emergency lighting driver device (1) according to claim 13, wherein the emergency lighting driver device (1) is configured to delay the pulse signal such that the rising edge(s) and/or falling edge(s) of the pulse signal have a transition time of at least 1.0 seconds and less than 3 seconds.

* * * * *